US006535139B1

(12) United States Patent
Lindler

(10) Patent No.: US 6,535,139 B1
(45) Date of Patent: Mar. 18, 2003

(54) ELECTRONIC PICTURE VIEWING APPARATUS

(76) Inventor: Tina M. Lindler, 11245 Garners Ferry Rd., Eastover, SC (US) 29044

( * ) Notice: Subject to any disclaimer, the term of this patent is extended or adjusted under 35 U.S.C. 154(b) by 54 days.

(21) Appl. No.: 09/849,414

(22) Filed: May 4, 2001

(51) Int. Cl.[7] .................................................. G08B 5/36
(52) U.S. Cl. ............................ 340/815.74; 340/815.49; 340/815.73
(58) Field of Search ..................... 340/815.4, 815.46, 340/815.47, 815.49, 815.58, 815.73, 815.74; 705/4, 161

(56) References Cited

U.S. PATENT DOCUMENTS

| 4,748,756 | A | | 6/1988 | Ross |
|---|---|---|---|---|
| 4,754,271 | A | | 6/1988 | Edwards |
| 5,359,374 | A | | 10/1994 | Schwartz |
| 5,365,686 | A | | 11/1994 | Scott |
| 5,504,836 | A | | 4/1996 | Loudermilk |
| 5,550,754 | A | * | 8/1996 | McNelley et al. ............. 348/13 |
| D396,351 | S | | 7/1998 | Patkunan |
| 6,003,008 | A | * | 12/1999 | Postrel et al. .................. 705/4 |
| 6,144,976 | A | * | 11/2000 | Silva et al. ................. 708/100 |
| 6,398,560 | B1 | * | 6/2002 | Mizuno ....................... 439/67 |

* cited by examiner

Primary Examiner—Van Trieu

(57) ABSTRACT

An electronic picture viewing apparatus for displaying electronic images in a picture frame type setting. The electronic picture viewing apparatus includes a housing having a back wall, a top wall, a bottom wall and a pair of side walls. Each of the side walls has a back edge and a front edge wherein the back edges abut the back wall. A display for displaying an electronic image has a backside integrally coupled to the front edges of the housing. A microprocessor for controlling a video signal to the display is positioned in the housing and operationally coupled to the display. A power supply is operationally coupled to the microprocessor. An interface interfaces a plurality of peripherals with the microprocessor. The interface is positioned in one of the side walls of the housing and operationally coupled to the microprocessor. The display displays an electronic image received from the peripherals.

10 Claims, 3 Drawing Sheets

ELECTRONIC PICTURE VIEWING APPARATUS

BACKGROUND OF THE INVENTION

1. Field of the Invention

The present invention relates to electronic display devices and more particularly pertains to a new electronic picture viewing apparatus for displaying electronic images in a picture frame type setting.

2. Description of the Prior Art

The use of electronic display devices is known in the prior art. More specifically, electronic display devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,754,271; U.S. Pat. No. 5,359,374; U.S. Pat. No. 5,365,686; U.S. Pat. No. 4,748,756; U.S. Pat. No. 5,504,836; and U.S. Des. Pat. No. 396,351.

While these devices fulfill their respective, particular objectives and requirements, the aforementioned patents do not disclose a new electronic picture viewing apparatus. The inventive device includes a housing having a back wall, a top wall, a bottom wall and a pair of side walls. Each of the side walls has a back edge and a front edge wherein the back edges abut the back wall. A display means for displaying an electronic image has a backside and a viewing side. The back side is integrally coupled to the front edges of the housing. A control means for controlling a video signal to the display means is positioned in the housing and operationally coupled to the display means. A power supply is operationally coupled to the control means. An interface means interfaces a plurality of peripherals with the control means. The interface means is positioned in one of the side walls of the housing and operationally coupled to the control means. The display means displays an electronic image received from the peripherals.

In these respects, the electronic picture viewing apparatus according to the present invention substantially departs from the conventional concepts and designs of the prior art, and in so doing provides an apparatus primarily developed for the purpose of displaying electronic images in a picture frame type setting.

SUMMARY OF THE INVENTION

In view of the foregoing disadvantages inherent in the known types of electronic display devices now present in the prior art, the present invention provides a new electronic picture viewing apparatus construction wherein the same can be utilized for displaying electronic images in a picture frame type setting.

The general purpose of the present invention, which will be described subsequently in greater detail, is to provide a new electronic picture viewing apparatus apparatus and method which has many of the advantages of the electronic display devices mentioned heretofore and many novel features that result in a new electronic picture viewing apparatus which is not anticipated, rendered obvious, suggested, or even implied by any of the prior art electronic display devices, either alone or in any combination thereof.

To attain this, the present invention generally comprises a housing having a back wall, a top wall, a bottom wall and a pair of side walls. Each of the side walls has a back edge and a front edge wherein the back edges abut the back wall. A display means for displaying an electronic image has a backside and a viewing side. The back side is integrally coupled to the front edges of the housing. A control means for controlling a video signal to the display means is positioned in the housing and operationally coupled to the display means. A power supply is operationally coupled to the control means. An interface means interfaces a plurality of peripherals with the control means. The interface means is positioned in one of the side walls of the housing and operationally coupled to the control means. The display means displays an electronic image received from the peripherals.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new electronic picture viewing apparatus apparatus and method which has many of the advantages of the electronic display devices mentioned heretofore and many novel features that result in a new electronic picture viewing apparatus which is not anticipated, rendered obvious, suggested, or even implied by any of the prior art electronic display devices, either alone or in any combination thereof.

It is another object of the present invention to provide a new electronic picture viewing apparatus which may be easily and efficiently manufactured and marketed.

It is a further object of the present invention to provide a new electronic picture viewing apparatus which is of a durable and reliable construction.

An even further object of the present invention is to provide a new electronic picture viewing apparatus which is susceptible of a low cost of manufacture with regard to both materials and labor, and which accordingly is then susceptible of low prices of sale to the consuming public, thereby making such electronic picture viewing apparatus economically available to the buying public.

Still yet another object of the present invention is to provide a new electronic picture viewing apparatus which provides in the apparatuses and methods of the prior art some of the advantages thereof, while simultaneously overcoming some of the disadvantages normally associated therewith.

Still another object of the present invention is to provide a new electronic picture viewing apparatus for displaying electronic images in a picture frame type setting.

Yet another object of the present invention is to provide a new electronic picture viewing apparatus which includes a housing having a back wall, a top wall, a bottom wall and a pair of side walls. Each of the side walls has a back edge and a front edge wherein the back edges abut the back wall. A display means for displaying an electronic image has a backside and a viewing side. The back side is integrally coupled to the front edges of the housing. A control means for controlling a video signal to the display means is positioned in the housing and operationally coupled to the display means. A power supply is operationally coupled to the control means. An interface means interfaces a plurality of peripherals with the control means. The interface means is positioned in one of the side walls of the housing and operationally coupled to the control means. The display means displays an electronic image received from the peripherals.

Still yet another object of the present invention is to provide a new electronic picture viewing apparatus that allows a person to view electronic versions of pictures without the need of a computer.

Even still another object of the present invention is to provide a new electronic picture viewing apparatus that stores a plurality of pictures.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
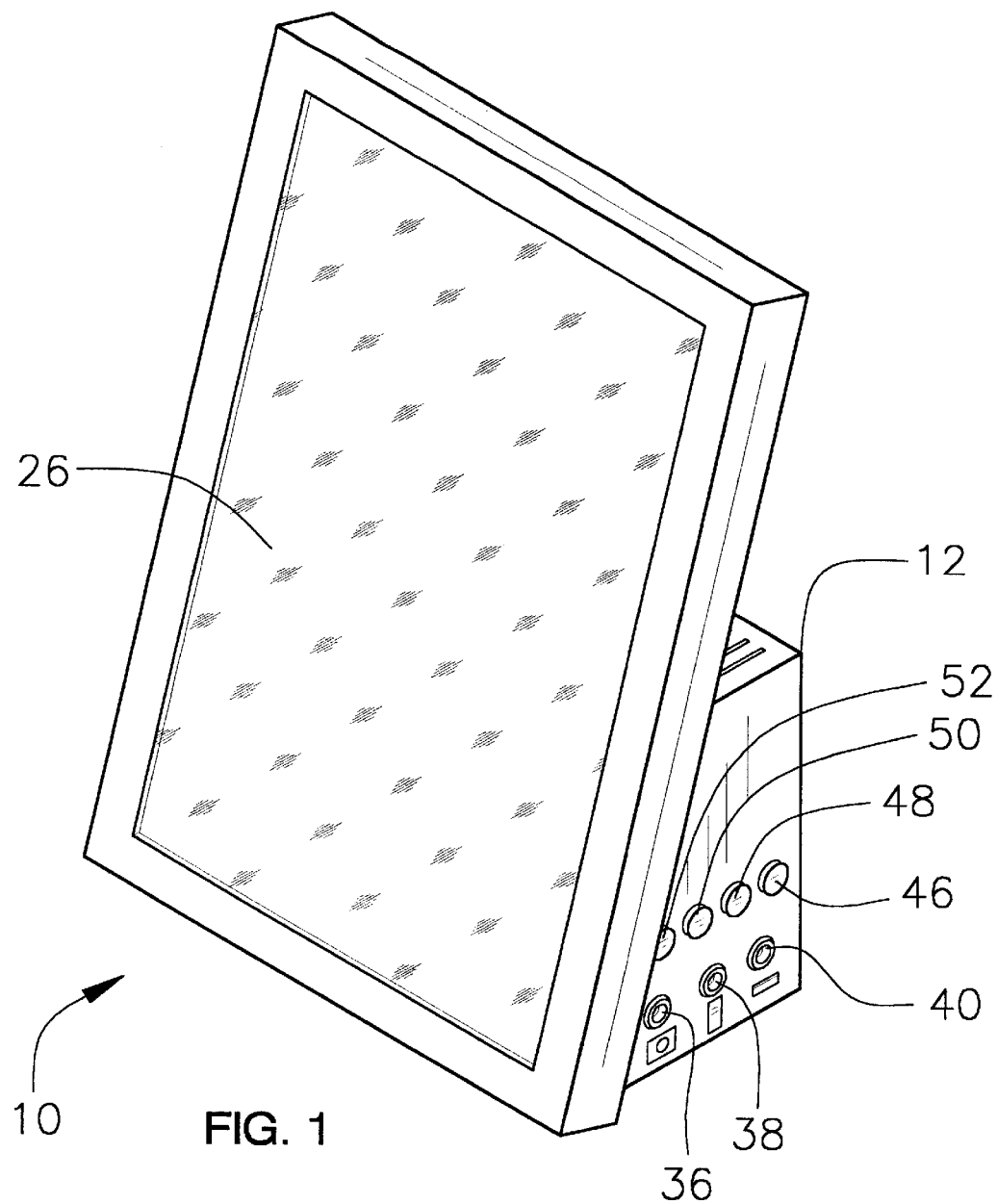
FIG. 1 is a schematic front perspective view of a new electronic picture viewing apparatus according to the present invention.
Figure 2:
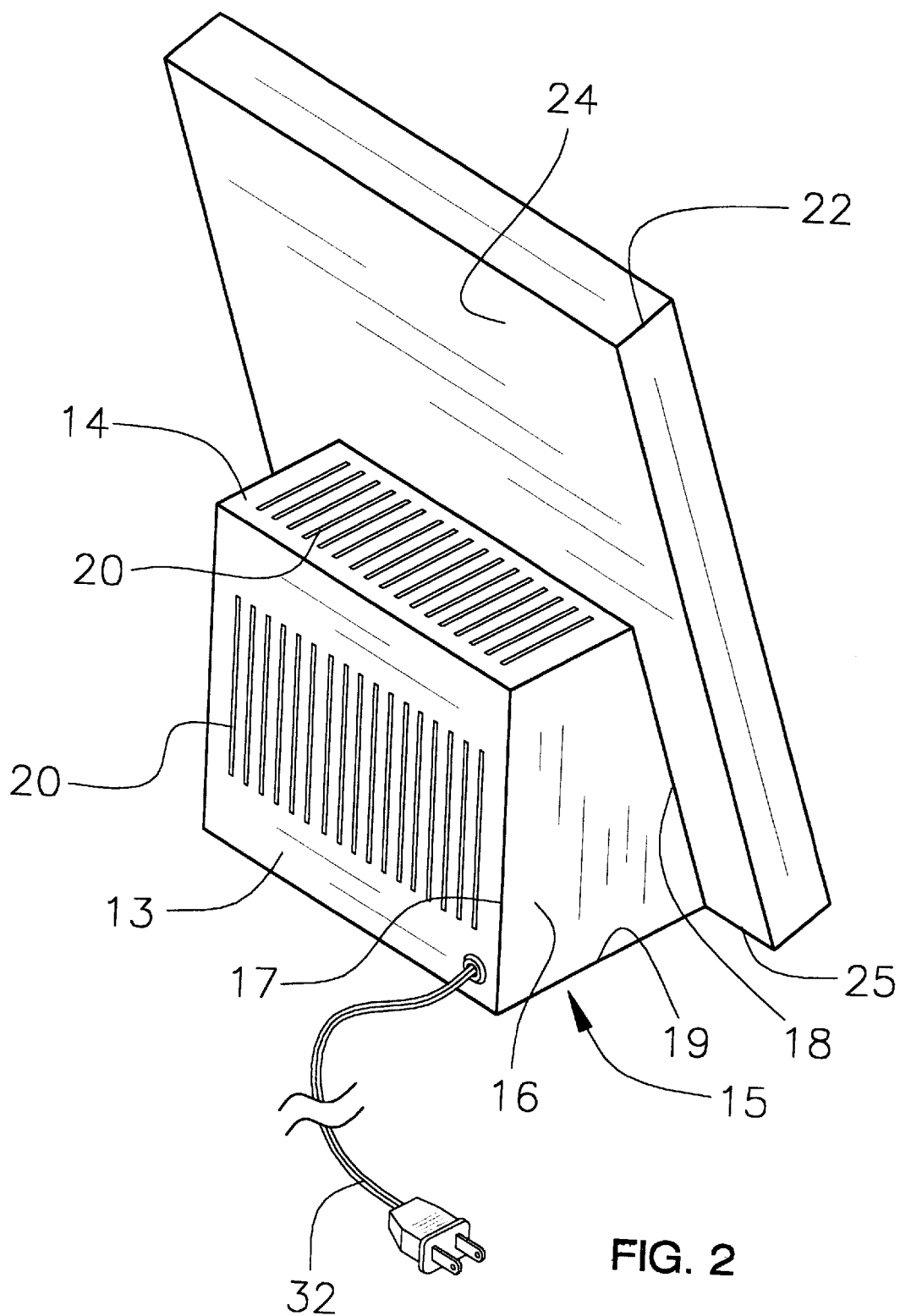
FIG. 2 is a schematic back perspective view of the present invention.
Figure 3:
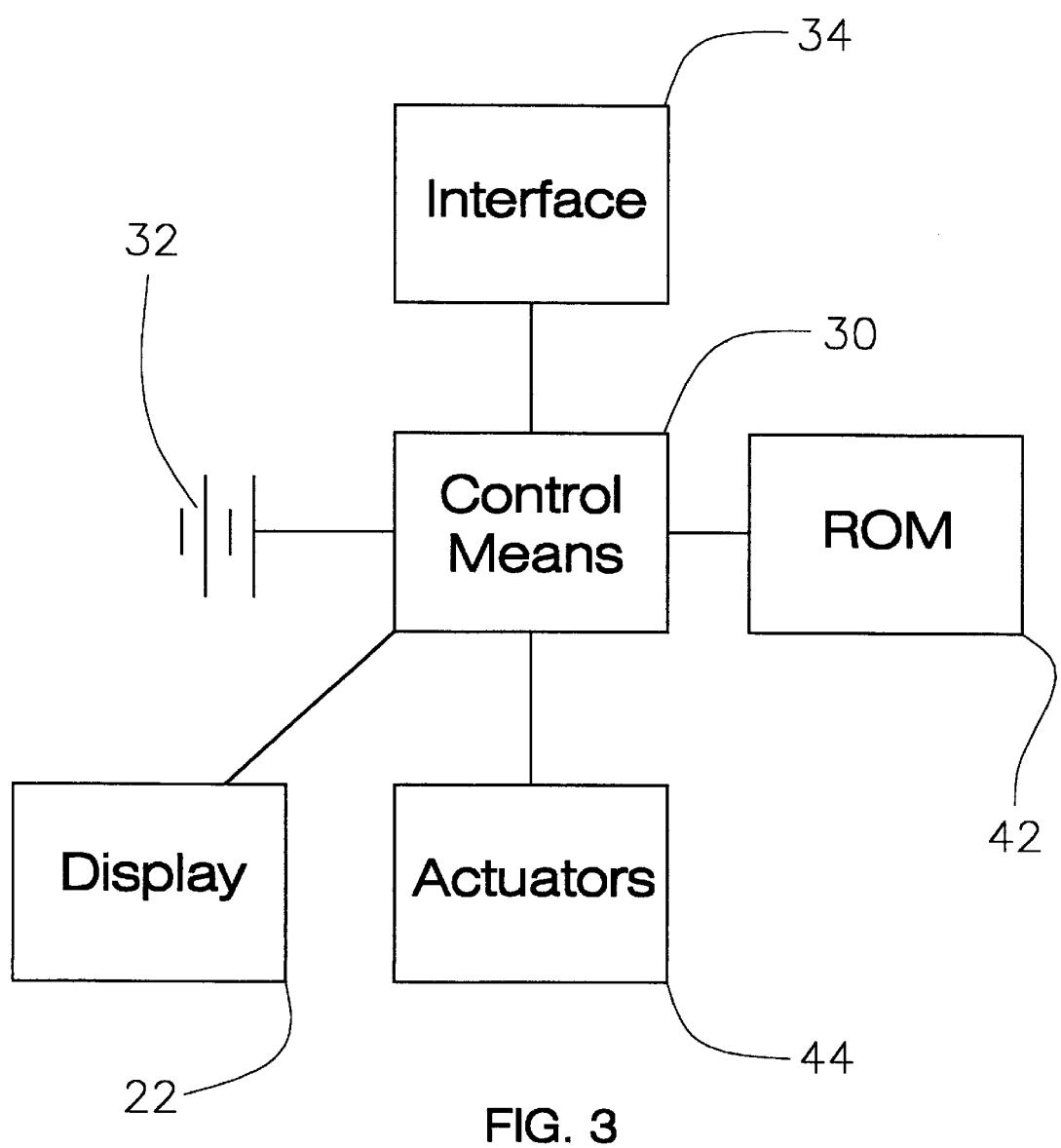
FIG. 3 is a schematic view of the present invention.

With reference now to the drawings, and in particular to FIGS. 1 through 3 thereof, a new electronic picture viewing apparatus embodying the principles and concepts of the present invention and generally designated by the reference numeral 10 will be described.

As best illustrated in FIGS. 1 through 3, the electronic picture viewing apparatus 10 generally comprises a housing 12 having a back wall 13, a top wall 14, a bottom wall 15 and a pair of side walls 16. Each of the side walls 16 has a back edge 17 and a front edge 18 wherein the back edges 17 abut the back wall 13. The front edges 18 angle outwardly from the top wall 14 to the bottom wall 15 such that an angle defined by the front edges 18 and a bottom edge 19 of each of the side walls 16 is generally between 85 degrees and 65 degrees. The back 13 and top walls 14 have a plurality of elongated slots 20 therein extending into an interior of the housing 12 for cooling the interior of the housing.

A display means 22 for displaying an electronic image has a backside 24 and a viewing side 26. The back side 22 is integrally coupled to the front edges 18 of the housing 12 such that a bottom edge 25 of the backside 24 is abutting the bottom wall 15 of the housing 12. The display means 22 preferably comprises a liquid crystal display type device.

A control means 30 for controlling a video signal to the display means 22 is operationally coupled to the display means 22. The control means 30 is positioned in the housing 12 and preferably comprises a microprocessor.

A power supply 32 is operationally coupled to the control means 30 and is ideally an electrical plug, though a battery is also envisioned.

An interface means 34 interfaces a plurality of peripherals with the control means 30. The interface means 34 is positioned in one of the side walls 16 of the housing 12 and is operationally coupled to the control means 30. The interface means 34 comprises a computer port 36, a digital camera port 38 and a scanner port 40 for interfacing the control means with the user's choice of a digital camera, computer or scanner. The ports are preferably universal serial bus ports for high speed data transmission, though any conventional port may be used.

A memory storage means 42 for storing electronic data is positioned in the housing 12 and operationally coupled to the control means 30. The memory storage means 42 stores electronic data transferred from the control means from the peripherals. The memory storage means 42 may be any conventional ROM type of storage device.

A plurality of actuators 44 is positioned on one of the side walls 16 of the housing 12 and each is operationally coupled to the control means 30. A first of the actuators 46 is adapted for selecting between a plurality of sets of stored electronic data, wherein each of the sets defines a viewable electronic image displayable on the display means 22. A second of the actuators 48 is adapted for initiating a menu on the display means. A third 50 and fourth 52 of the actuators is adapted for selecting choices on the menu. The menu containing conventional choices for zooming, contrast, tint and other types of viewing options generally associated with a computer display screen.

In use, the peripherals are used for downloading images into the memory 42 or directly to the display means 22 via the control means 30. The control means 30 transfers these images to the display means 22 such as a picture would look in a typical picture frame. The device 10 may hold multiple pictures which may be selectively chosen and viewed.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An electronic picture frame device comprising:
    a housing having a back wall, a top wall, a bottom wall and a pair of side walls, each of said side walls having a back edge and a front edge wherein said back edges abut said back wall;
    a display means for displaying an electronic image, said display means having a backside and a viewing side, said back side being integrally coupled to said front edges of said housing such that a central portion of a bottom edge of said backside is abutting said bottom wall of said housing;
    a control means for controlling a video signal to said display means being operationally coupled to the display means, said control means being positioned in said housing;
    a power supply being operationally coupled to said control means;
    an interface means for interfacing a plurality of peripherals with the control means, said interface means being positioned in one of said side walls of said housing and operationally coupled to said control means;
    wherein said display means displays an electronic image received from said peripherals; and
    wherein said backside of said display means extends outwardly from said front edges of said housing for facilitating concealment of said housing behind said display means to a viewer positioned indirectly in front of said viewing side of said display means.

2. The electronic picture frame device as in claim 1, wherein said front edges angle outwardly from said top wall to said bottom wall such that an angle defined by said front edges and a bottom edge of each of said side walls is generally between 85 degrees and 65 degrees.

3. The electronic picture frame device as in claim 2, further comprising:
    a memory storage means for storing electronic data, said memory storage means being positioned in said housing and operationally coupled to said control means, wherein said memory storage means stores electronic data transferred from said control means from said peripherals.

4. The electronic picture frame device as in claim 3, further including:
    an actuator being position ed on one of said side walls of said housing and being operationally coupled to said control means, said actuator being adapted for selecting between a plurality of sets of stored electronic data, wherein each of said sets defines a viewable electronic image displayable on said display means.

5. The electronic picture frame device as in claim 1, wherein said back and top walls have a plurality of elongated slots therein extending into an interior of said housing.

6. The electronic picture frame device as in claim 1, wherein said display means comprises a liquid crystal display.

7. The electronic picture frame device as in claim 1, wherein said interface means comprises a computer port, a digital camera port and a scanner port.

8. The electronic picture frame device as in claim 1, further comprising:
    a memory storage means for storing electronic data, said memory storage means being positioned in said housing and operationally coupled to said control means, wherein said memory storage means stores electronic data transferred from said control means from said peripherals.

9. The electronic picture frame device as in claim 8, further including:
    an actuator being positioned on one of said side walls of said housing and being operationally coupled to said control means, said actuator being adapted for selecting between a plurality of sets of stored electronic data, wherein each of said sets defines a viewable electronic image displayable on said display means.

10. An electronic picture frame device comprising:
    a housing having a back wall, a top wall, a bottom wall and a pair of side walls, each of said side walls having a back edge and a front edge wherein said back edges abut said back wall, said front edges angling outwardly from said top wall to said bottom wall such that an angle defined by said front edges and a bottom edge of each of said side walls is generally between 85 degrees and 65 degrees, said back and top walls having a plurality of elongated slots therein extending into an interior of said housing;
    a display means for displaying an electronic image, said display means having a backside and a viewing side, said back side being integrally coupled to said front edges of said housing such that a bottom edge of said backside is abutting said bottom wall of said housing such that a central portion of a bottom edge of said backside is abutting said bottom wall of said housing, said display means comprising a liquid crystal display;
    a control means for controlling a video signal to said display means being operationally coupled to said display mean, said control means being positioned in said housing;
    a power supply being operationally coupled to said control means;
    an interface means for interfacing, a plurality of peripherals with the control means, said interface means being positioned in one of said side walls of said housing and operationally coupled to said control means, said interface means comprising a computer port, a digital camera port and a scanner port;

a memory storage means for storing electronic data, said memory storage means being positioned in said housing and operationally coupled to said control means, wherein said memory storage means stores electronic data transferred from said control means from said peripherals;

a plurality of actuators being positioned on one of said side walls of said housing and being operationally coupled to said control means, a first of said actuators being adapted for selecting between a plurality of sets of stored electronic data, wherein each of said sets defines a viewable electronic image displayable on said display means, a second of said actuators being adapted for initiating a menu on said display means, a third and fourth of said actuators being adapted for selecting choices on said menu; and wherein said backside of said display means extends outwardly from said front edges of said housing for facilitating concealment of said housing behind said display means to a viewer positioned indirectly in front of said viewing side of said display means.

* * * * *